United States Patent [19]

Layden et al.

[11] Patent Number: 5,339,257
[45] Date of Patent: Aug. 16, 1994

[54] REAL-TIME STATISTICAL PROCESS MONITORING SYSTEM

[75] Inventors: John E. Layden; David J. Layden, both of Indianapolis; Thomas H. Pearson, Fishers, all of Ind.

[73] Assignee: Automated Technology Associates Inc., Indianapolis, Ind.

[21] Appl. No.: 700,548

[22] Filed: May 15, 1991

[51] Int. Cl.$^5$ .......................... H04J 3/14; G06F 15/20
[52] U.S. Cl. ................................ 364/552; 364/474.16
[58] Field of Search ............... 364/552, 554, 551.01, 364/469, 474.16, DIG. 1, DIG. 2, 150, 188, 550; 395/155, 157, 158; 340/715

[56] References Cited

U.S. PATENT DOCUMENTS

| | | | |
|---|---|---|---|
| 2,883,255 | 4/1959 | Anderson | 364/DIG. 1 |
| 3,242,321 | 3/1966 | Chope | 364/469 |
| 3,544,774 | 12/1970 | Peklenik | 364/552 |
| 4,145,744 | 3/1979 | Sidorovich et al. | 364/554 |
| 4,471,348 | 9/1984 | London et al. | 340/715 |
| 4,630,189 | 12/1986 | Ottmori et al. | 364/150 |
| 4,639,882 | 1/1987 | Keats et al. | 364/550 |
| 4,644,480 | 2/1987 | Haruna et al. | 364/552 |
| 4,761,748 | 8/1988 | Le Rat et al. | 364/551.01 |
| 4,937,763 | 6/1990 | Mott | 364/551.01 |
| 5,031,110 | 7/1991 | Yocom | 364/550 |
| 5,032,978 | 7/1991 | Watson et al. | 364/188 |
| 5,070,468 | 12/1991 | Ninomi et al. | 364/550 |

FOREIGN PATENT DOCUMENTS 0514104  11/1992  European Pat. Off. .

OTHER PUBLICATIONS

Shaw; "Statistical Process Control for Chemical and Petroleum Industries"; Advances in Inst. and Cont. (1989).

Stephens; "On-Line Distributed Control System Tools for Statistical Process Control"; Advances in Inst. and Cont. (1988).

Primary Examiner—Ellis B. Ramirez
Attorney, Agent, or Firm—Locke Reynolds

[57] ABSTRACT

A system for monitoring a multiparameter manufacturing process by examining on a real-time basis a stream of data units, each data unit including a numerical characteristic indicative of a current state of one of the parameters of that manufacturing process and a tag identifying the parameter. The system employs an entity-relational database to group and evaluate all data units using statistical evaluation criteria, and to identify and generate signals relating to particular testpoints in the manufacturing process so that an indication of the significance of the statistical pattern and the manufacturing process parameter involved are given in such terms as to permit human evaluation of and, if necessary, manual or automatic intervention in the manufacturing process.

36 Claims, 4 Drawing Sheets

REAL-TIME STATISTICAL PROCESS MONITORING SYSTEM

BACKGROUND OF THE INVENTION

This invention relates to computer based process monitoring systems for use in various manufacturing operations. The invention particularly relates to such systems which seek to apply statistical process control analysis to multiparameter manufacturing operations on a continuous basis with contemporaneous reporting of the results in human readable form.

The manufacture of all goods includes at least one step or process by which material of a first composition and configuration is modified to assume a second configuration and/or composition. Each such step or process involves the application to the first material of one or more forces, or the addition or subtraction of matter or energy to arrive at the second. Generally, the manufacturing processes are very complex with dozens, if not hundreds or even thousands, of individual elemental process being applied to an initial set of materials to ultimately form a final product. For example, a given product may achieve an intermediate stage or its final form by the individual elemental process of heating a body of material for a specific period of time or drilling a hole in a body of material of a specific size to a specific depth.

Where overall product uniformity is desirable, each of the individual elemental processes is preferably keep as uniform as possible. Contemporary quality control theory recognizes that some variation in each individual elemental process will occur and that some tolerances must be provided which define whether a product is considered acceptable. The permissible variation in some individual elemental processes can be relatively large while in others the variation must be very small. It is additionally recognized that the variations within the individual elemental processes can be subjected to a statistical analysis. Such analysis can identify those processes in which a non-random variation is occurring and distinguish variation occurring due to an un-correctable cause such as naturally expected variation in material density or the like. It is assumed that any non-random variation is due to a correctable cause such as a worn or loose tool, an out of sync timer, or the like.

In order to monitor a selected individual elemental process it is merely necessary to identify one or more measurable values or attributes directly associated with the successful completion of that individual elemental process, for example, the depth, diameter, and angle relative to a surface of a whole which has been drilled, or the color of the surface surrounding that hole. Appropriate gauges are adopted for each measurable characteristic and applied to the stream of goods subsequent to the process in question. Appropriate sampling of the stream of goods will give sufficient information to permit the application of statistical analysis in some situations. If the sampling is increased appropriately, the statistical analysis tends to give more accurate and more timely identification of variations occurring is due to correctable causes. The ultimate analysis is achieved by applying the gauges to all of the goods resulting from the process rather than merely a sampling. As a practical matter, manual gauging and statistical analysis of the results is usually not possible due to the significant demands on manpower and resulting time delays effectively slowing the manufacturing process.

Computers have been called on to assist in this measurement and assessment of process variables. A given stream of goods may be subjected to specific gauging operations with the aid of computer controlled robots which manipulate gauges and each workpiece in the same way each time to take any number of selected measurements. Additional gauges can be applied to the apparatus carrying out the manufacturing process so as to reflect the process parameters themselves rather than a product attribute. The output of each gauge which reflects a measurement taken may then be fed into a data base of the same or, more likely, another computer along with an identification of the selected measurement, commonly called a tag. The data base may then be subjected to selected programs intended to provide the numerical analysis concerning the many parameters in the process leading to the stream of goods. The output of such programs is desirably expressed in a humanly perceivable form such as control charts and production record tables, or even video displays, which can then be scanned by the persons responsible for the manufacturing process. Upon the identification of a problem as reflected in the control charts, production record tables, etc., corrective action can be taken.

While this is a vast improvement over any manual operation, there often is very little time available to production personnel to review and interpret the control charts, production record tables, etc., so that timely corrective action can be taken. This is particularly true where a large number of individual elemental processes are being monitored, each of which is capable of causing a computer to generate control charts and production record tables. In such a situation, the production personnel are faced with the substantial problem of even identifying which of the many control charts, production record tables, etc., should be examined for possible problem identification. This leads to time delays in process error identification, and related delays in process correction, thus leading to significant amounts of non-compliant goods.

Thus, the central problem sought to be solved by the present invention is a real-time identification of any process which requires prompt human attention, and if necessary intervention. That is, out of the hundreds or even thousands of variable parameters in a given manufacturing process, only a handfull deserve human attention at any given instant in time. The remaining process parameters are behaving in a normal manner and human review of such normally behaving parameters is unlikely to result in any significant process or product improvement. Thus, an object of the present invention is the computer-aided identification of any process parameter in a multiparameter manufacturing process requiring attention. Another object of the present invention is the communication of such computer-aided identification in a manner which will elicit a prompt human evaluation of the problem identified to permit timely intervention in the manufacturing process, if warranted.

SUMMARY OF THE INVENTION

In order to promptly identify in a multiparameter manufacturing process any incremental portion which may be contributing to the production of non-compliant goods, the inefficient production of compliant goods, or other processing errors, without any significant addition of manpower, a process monitoring system in accordance with the present invention includes means for subjecting all selected process variables associated with a manufacturing process to one or more statistical analyses on a real-time basis, means for indicating when any process variable which fails any of a number of criteria, means for identifying the source of any process variable which fails said criteria, and means for displaying the statistical history of any process variable so identified while optionally allowing the manufacturing process and the real-time statistical analysis thereof to continue.

A general feature of the present invention is the incorporation in a computer system providing continuous statistical analysis of a large number of manufacturing variables of means for identifying and calling attention to those variables which require human evaluation and possible process intervention. This general feature gives the user of such a system the advantage of relieving the user of the need to screen a significant volume of unimportant information in order to identify that which truly requires the user's attention.

In accordance with the present invention, a multiparameter manufacturing process is monitored by examining on a real-time basis a stream of data units, each data unit including a numerical characteristic indicative of a current state of one of the parameters of that manufacturing process and a tag identifying the parameter. The method comprises the steps of:

grouping, for all data units having certain previously specified tags, all of the data units having identical tags together into groups of numerical characteristics, the size of each group being selectively variable for each tag, examining each group of numerical characteristics assembled by the grouping means so as to recognize selected statistical patterns in the numerical characteristics, each pattern recognized providing an output of a result value indicative of the such recognition, storing the result values in a plurality of registers, each register receiving the result values relating to a single recognized pattern of a single specified tag, comparing the content of each register with a chosen standard for that register after each result value is received in the register to provide a comparison result at an output thereof indicative of the significance of any detected statistical pattern, and signalling to at least one controller of the manufacturing process the comparison result of any register the output of which indicates that a statistically significant pattern of numerical characteristics has been identified, the signalling including indicating the significance of the pattern and the manufacturing process parameter involved to permit human evaluation of and, if necessary, intervention in the manufacturing process.

One particular feature of the present invention is the incorporation of statistical analysis functions which permit each parameter of a manufacturing process to be evaluated on a real-time basis with respect to any number of statistical tests. The statistical tests can be used to evaluate both the individual points of data collected from the manufacturing process and groups of points of any selected group size desired. This specific feature has the advantage of being able to timely identify not only situations where the manufacturing process approaches or exceeds set limits for the process, but also permits the identification of situations in which non-statistical behavior is occurring in the manufacturing process. Such non-statistical behavior usually indicates the development of problems in the manufacturing process which should be addressed and are often hidden.

Another specific feature of the present invention is the use of specific registers for the storage of the results of such tests for non-statistical behavior. The contents of each register is updated upon the completion of each test thereby insuring that each register reflects the current status and recent history of a particular statistical test of one manufacturing process parameter. With each entry into such a register, the content of that register is compared to a preset standard to evaluate the significance of any observed non-statistical behavior. This significance evaluation permits the computer to screen out insignificant system error while calling attention to those manufacturing process variables which require human evaluation and possible process intervention.

Another feature of the present invention is the use of a window alarm presentation of information to a user of the system which allows the user to select for review any of the data and corresponding statistical analysis for review at any time. The system can also be integrated with other conventional types of process information and control including proportional integration and differentiation control systems. In the windows presentation feature, means are provided for an iconic presentation of the current condition of the manufacturing process, the iconic presentation being one which can be minimally intrusive and quickly interpreted by an operator of the manufacturing system. The windows presentation feature allows the alarm information to be presented without interrupting the other current work or analysis being conducted by the system user. Additionally the alarm presentation can be programmed to be terminal selective so as to bring only selected alarm information to a given terminal, thereby directing the alarm information to the system user or users most likely to be interested in the information being presented.

Additional features and advantages of the present invention will become apparent to those skilled in the art from the following description of a preferred embodiment of the invention exemplifying the best mode of carrying out the invention as presently perceived. The detailed description particularly refers to the accompanying drawings.

DESCRIPTION OF THE PREFERRED EMBODIMENT

Figure 1:
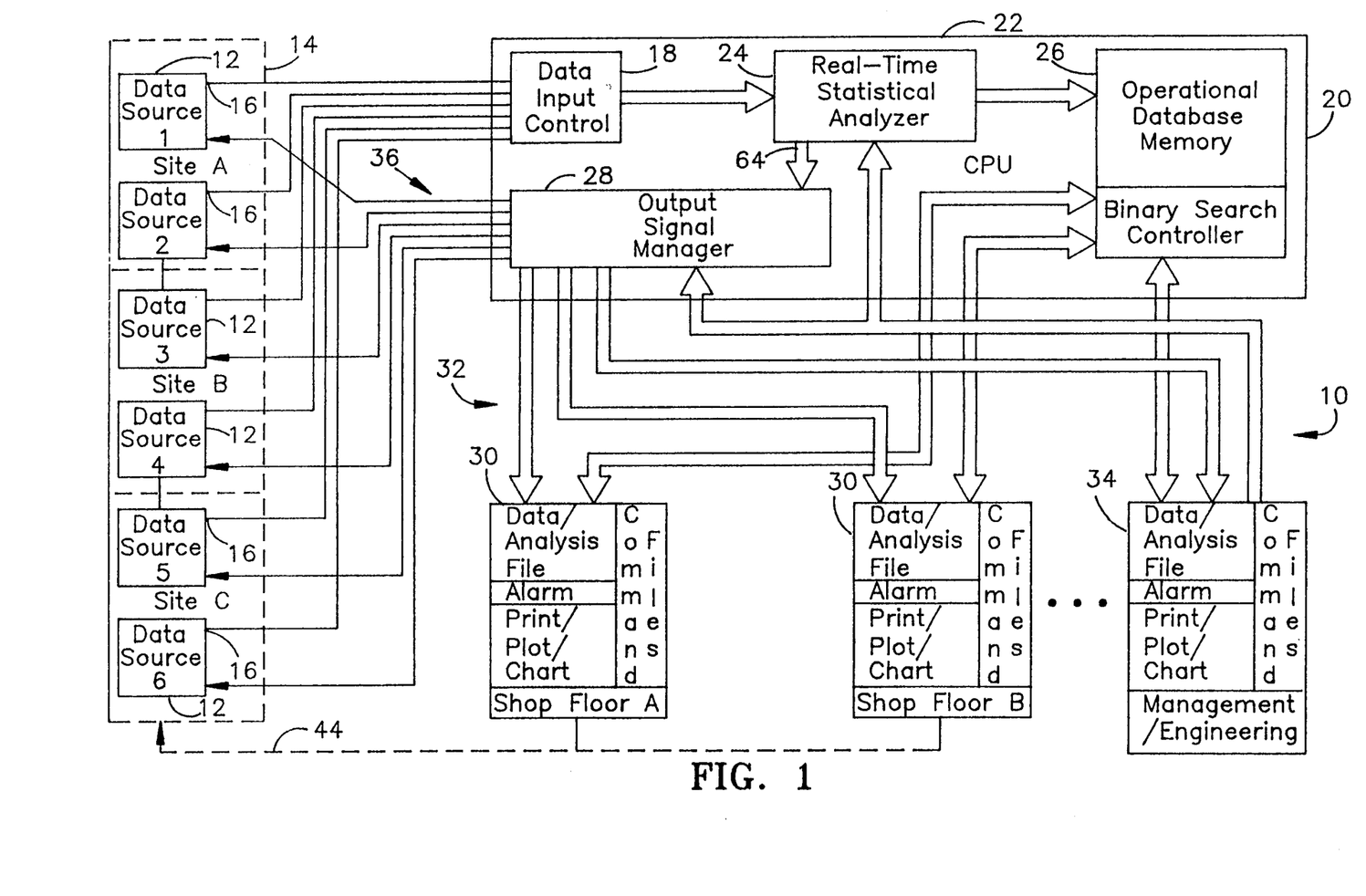
FIG. 1 is a block diagram of a system for monitoring a manufacturing process in accordance with the present invention.

A manufacturing process monitoring system 10 in accordance with the present invention is shown in FIG. 1. The system 10 is connected to a plurality of data sources 12. Each data source 12 can be viewed as representing a sensor measuring a particular manufacturing parameter such as length, temperature, color, weight, etc., at a particular data testpoint. Alternatively, each data source 12 can be viewed as a piece of manufacturing apparatus such as a still, extruder, etc. to which is attached a number of measuring devices sensing at various data testpoints a plurality of process parameters on the apparatus. It will of course be appreciated that even a manual data entry terminal could for a data source 12. The data sources 12 are grouped together into a plurality of sites 14 which may be viewed as manufacturing lines within a single plant, each line manufacturing a particular item or set of items, or manufacturing subdivisions or stations of a single line having a large number of process steps. It is to be understood that the process monitoring system 10 of the present invention is adaptable to a wide variety of manufacturing processes although specific examples will be given herein by way of illustration to permit better understanding of the system 10 and its operation.

Each data source 12 at each site 14 has an output 16 at which one or more process parameters associated with the manufacturing process occurring at the particular site 14. The output 16 is connected to a general purpose computer 20 such as a Hewlett-Packard Series 9000, a Digital Equipment VAX/VMS, or other similar computer. The central processing memory 22 of the computer 20 can be viewed as containing several distinct portions, namely, a data input control portion 18, a real-time statistical analyzer portion 24, a operational database memory portion 26 and an output signal manager portion 28.

As data is received at the input 18, it is serially introduced into the real-time statistical analyzer portion 24 where the data is subjected to one or more statistical analysis on a real-time basis. That is, the statistical analysis is event driven by the serial introduction of the data. A more complete description of that statistical analyzer portion 24 is provided later in connection with the discussion of FIG. 2. The result of that statistical analysis as well as the initial data itself is then introduced into the operational database memory 26. Certain of the initial data and significant results of the statistical analysis are also directed to the output signal manager portion 28.

In the event that at any testpoint a process parameter fails any of the applicable criteria by a statistically significant amount, the output signal manager portion 28 causes a signal to be transmitted via a LAN or other network 32 to one or more terminals 30 located in the immediate vicinity of the data source 12 at the particular manufacturing site 14 from which the initial data was received triggering the signal or signals. This allows personnel in the immediate vicinity of the manufacturing process in question, generally responsible for its performance, to immediately examine the situation and take whatever action, if any, is appropriate. The output signal manager portion 28 preferably can examine or poll all situations in which statistically significant events are being indicated and, based on previously established criteria, transmit signals relating to only the more significant condition or failure at any given testpoint. Preferably the signal transmitted by the output signal manager portion 28 continues until a change in the process parameter or condition is made, or until the statistical criteria for evaluating the data relating to the process parameter or condition is made. The preferred form of such signals generally includes information regarding the testpoint or testpoints involved, and the nature and the significance of the process parameter condition or failure. In the preferred form a windows presentation of information is employed using an iconic representation form which can quickly be interpreted by an appropriate operator in charge of the particular process involved. Preferably the iconic representation form is one which can be representative of a selected number of testpoints, the selection of the particular icon being based on the significance of the events detected or the number of events detected. A non-exclusive hierarchical presentation system is employed so that a number of conditions can be represented by a single icon to minimize the screen space occupied by the presentation.

The terminals 30 can be any number of a plurality of terminals located preferably directly adjacent to the manufacturing sites 14 and can include additional programming for machine control, such as conventional proportional integration and differentiation control management schemes, coupled by an appropriate link 44. In exceptional circumstances where an exceptional process error is detected, the output signal manager portion 28 causes an alarm or stop signal to be directed through one or more of the output lines 36 directly to the manufacturing apparatus at one or more of the selected sites.

Any signal transmitted from the output signal manager portion 28 to one of the terminals 30 can also be transmitted to a terminal 34 preferably manned by personnel in the engineering and manufacturing management area of the business. Such signals can be used as an ongoing source of information concerning the overall manufacturing process with a view to providing such departments with timely or even advance indications of necessary or desirable process design changes. Terminal 34 preferably includes the necessary management functions to allow modification of the alarm criteria, and other parameter testing criteria, set in the real-time statistical analyzer portion 24 and the output signal manager portion 28 of the system. Terminal 34 is preferably also able to modify the selected process parameters being analyzed by the real-time statistical analyzer portion 24 and to modify the precise nature of the statistical analysis being performed on data from each particular data testpoint or sets of similarly situated data testpoints. A better comprehension of the functional performance of the analyzer portion 24 and signal manager portion 28, as well as the management thereof by terminal 34 will be gained from a consideration of FIG. 2.

Figure 2:
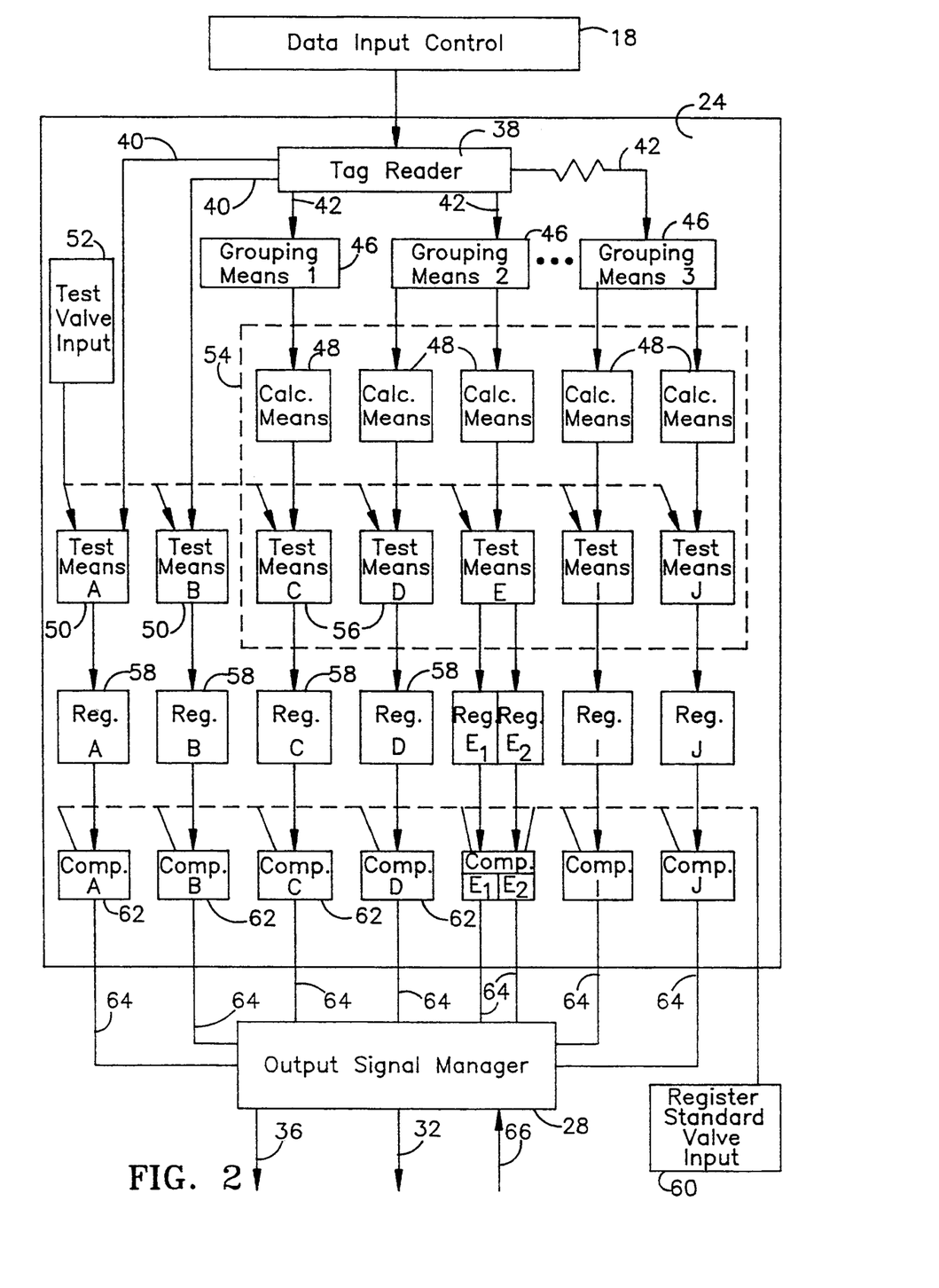
FIG. 2 is a block diagram of a real-time statistical analyzer according to the present invention.

The various streams of data coming from the various data sources 12 are directed to the input data control 18 where the streams of data can, if necessary, be buffered so as to appear to the statistical analyzer portion 24 as a single stream of input data. Each data unit is preferably in the form of a numerical characteristic indicative of a current state of one of the parameters of the manufacturing process being monitored, and a tag identifying the particular data testpoint where a manufacturing process is involved. The tag on each unit of the incoming stream of data is read by a tag reader 38 which uses this identification information to determine what statistical analyses are to be performed on each data unit. The statistical analyses to be performed are programmable based on instructions received by the statistical analyzer 24 from terminal 34. Based on these preset instructions, the tag reader 38 directs the data to one or more outputs 40, and 42. The outputs 40 are connected directly to testing means 50 for testing the numerical characteristic of the data unit against a test value stipulated by test value input 52 for that parameter. The outcome of that test is indicative of a current state of one of the parameters of the manufacturing process being monitored, for example, whether the characteristic of the parameter is above or below a stipulated control limit.

The outputs 42 of the tag reader 38 are connected to grouping means 46 which can take the form of summing registers for summing or otherwise grouping each group of numerical characteristics of the data units having identical tags together. The size of the group summed or otherwise grouped together by the grouping means 46 is selectively variable for each grouping means 46 based on prior instructions received by the statistical analyzer 24 from terminal 34. Optionally, more than one grouping means 46 can be employed to form groups of different size from data units having identical tags.

The grouping means 46 are all connected to pattern recognition means 54 for recognizing statistical patterns in the grouped numerical characteristics. This is achieved by each grouping means 46 being connected to one or more calculating means 48. Each calculating means 48 calculates a central tendency value for each group of numerical characteristics as the size of each group reaches the group size previously selected. The calculating means 48 can, for example, comprise means for determining a mean value for each sum of numerical characteristics as the size of each group reaches that previously selected. Other calculations of central tendency can provide, for example, an identification of the range of the numerical values for the characteristics for each parameter which occurs over any size group of numerical characteristics for the parameter. The range identification can be employed to also identify the maximum and minimum value for the parameter over the same set of values. It will be appreciated by those skilled in art that any number of statistic evaluations can be performed including a determination of standard deviation from the mean, etc.

The output of each calculating means is directed to a testing means 56 for testing the calculated central tendency value of the particular group of data units against a test value stipulated by test value input 52 indicative of a selected statistical pattern for that parameter. The outcome of that test is indicative of a current state of one of the parameters of the process being monitored, for example, where the mean value of the last n data units falls with respect to a preset expected performance mean and/or standard deviation. The outcome of that test is expressed as a result value, usually merely a 1, 0, or −1, which is then directed to at least one register 58 which receives the result values from only a single testing means 56 or 50. The registers 58 can be of any selected size to contain any number of result values. In this way the registers 58 reflect not only the current state of one of the parameters of the process being monitored, but also a history of the parameter, the length of the history being dependent on the size of the register.

The content of the registers 58 are examined following each entry of a data unit into the statistical analyzer portion 24. The examination is a comparison of the register content with a chosen standard value provided for each register 58 by a register standard value input 60. The comparison is conducted by comparing means 62 which provides a comparison result at outputs 64 indicative of the detection of a significant statistical pattern of behavior such as whether the characteristic of the parameter is exhibiting trending, cycling, stratification, etc.

The outputs 64 are connected to the output signal manager 28 and are preferably ranked in a selected order, the order reflecting the relative importance of the various possible statistical patterns for each process parameter. The order of relative importance can be programmed through input 66 from terminal 34. The output signal manager 28 selects the comparison result having the greatest relative importance for each parameter for which there is an indication of a statistically significant event occurring and generates a signal at output 32 indicative of the significance of the statistical pattern detected and the data testpoint involved so as to permit human evaluation of and, if necessary, intervention in the manufacturing process involved. In the preferred form a non-exclusive iconic representation form is employed which can quickly be interpreted by an appropriate operator in charge of the particular process involved. Preferably, the iconic representation form is hierarchical permitting a single icon of a selected shape and color to represent a selected condition at a selected number of testpoints, the selection of the particular icon being based on the significance of the events detected or the number of events detected. A commercial windows presentation system can be employed to minimize the intrusiveness and screen space occupied by the presentation, yet maximize the impact of the presentation to the operator. In circumstances where the significance of the statistical pattern indicates that an exceptional process error is occurring, the output signal manager portion 28 can also cause an alarm or stop signal to be directed through one or more of the output lines 36 directly to a manufacturing apparatus at one or more of the selected sites.

It will be appreciated by those skilled in the art that so long as the number of testsites from which data is received is fairly modest and the rate of production is regulated to remain below preset limits, then the required statistical analysis, including the storing and testing of values at two sequential levels, followed by a polling by the output signal manager can be achieved using standard relational databases. As the incoming data increases in volume and complexity, however, the processing time required to search standard look-up table lists quickly limits the rate at which new information can be processed. This has the effect of forcing the user to limit the scope or frequency of their manufacturing process examination to something below that which would otherwise be desirable. In order to overcome this deficiency, a preferred database is constructed which is entity-relational in structure generally avoiding the use of look-up tables and using instead preferred query paths which are memory-resident and specified by the user at the time the database structure is defined. An example of such a database system is ERDB available from Automated Technology Associates, Indianapolis, Ind.

The entity-relational database of the preferred embodiment is constructed with two different types of data-receiving fields referred to generally as entities. The two different kinds of entities are called "keys" and "items". Key fields are fields which contain a group of data entries each of which is unique. An example of a key field is one containing a list of the serial numbers assigned to the articles of a particular manufacturing process. Since no two articles of the same process have the same serial number, it follows that the field containing the list of the serial numbers is one in which each entry is unique. In a entity-relational database of the preferred embodiment, all key fields are sorted as the entries are made into the field. Thus the entries of a key field form at all times an ordered array or flat file which can quickly be searched using a binary search to locate the desired entry without having to read all the entries in the field. An item field, on the other hand, is one which contains entries which are not necessarily unique. An example of an item field is one containing a list of all the model numbers of parts produced in the order of their production where a multitude of parts carrying each model number is manufactured. Since item fields will usually contain entries which are duplicates of other entries in that same field, retrieval access to the information in an item field must be through another field.

All entities are related to each other by relationships defined at the time of establishing the database. There are two fundamental kinds of relationships, namely, a one-to-one relationship and a one-to-zero or more relationship (which can also be thought of as a one-to-many relationship, where "many" can have any value including zero). An example of a one-to-one relationship is that existing between article serial number and the date/time for the completion of manufacture of each of the articles given serial numbers. An example of a one-to-many relationship is that existing between model numbers and serials numbers on parts manufactured at a particular site. That is, while each part has only a single model number and a single serial number, a group of n parts can have from 0 to n model numbers but must have n serial numbers.

In addition to the direct relationships described previously, chain relationships are also implied. That is, if field A has a one-to-one relationship with field B, and field B has a one-to-one relationship with field C, then it is implied that field A has a one-to-one relationship with field C. The fields are organized by these entity relationships into a logical structure which allows query paths to be built into the structure. One the relationships are defined, the data entered into the database is quickly and easily accessed. For example, once the relationships between the serial number field and the model number field are set as previously discussed, then it is easy to see that if one knew the serial number of a particular part, one could expect to quickly identify its model number. Conversely, if one knew the identity of a particular group of parts by a common model number, one could expect to quickly identify the list of serial numbers for all parts in the group. One combination of relationships between fields is not permitted in an entity-relational database, namely, a so-called "many-to-many" relationship, because it simply fails to have sufficient information to permit the type of information retrieval required of such a system.

To graphically symbolize an entity-relational database, fields can be represented by boxes or bubbles, with each box or bubble containing a single entity file which can be thought of as a sorted or ordered flat file of information concerning a single variable or characteristic. The relationships between fields is indicated by arrows. A single headed arrow means a one-to-one relation exists in the direction of the arrow. A double headed arrow means a one-to-many relation exists in the direction of the arrow. These two relationships can be combined and indicated by a single headed arrow one direction and a double headed arrow the other direction such as that shown between part number and serial number in FIG. 3. That is, for every part serial number listed in field 70, there is one and only one model number listed in field 72, and thus only a single arrowhead 74. However, for every model number listed in field 72, there are any number of serial numbers listed in field 70, and hence the double arrowhead 76.

To accomplish the ready data retrievability actually required in a real-time manufacturing process monitoring system according to the present invention it is desirable to also use some additional relationship defining fields to construct the desired data query paths. The additional relationship defining fields are in the form of linking lists which correlate the entries in two other fields, which may be entity fields or other relationship defining fields. All linking lists are preferably internally organized as "doubly-linked lists", with the values being inserted in each of the doubly-linked lists in an ordered array, such that retrieval of the relationship information may be obtained in either direction. The linking lists thus constitute indirect addressing for each entry in two other fields, which may be entity fields or other relationship defining fields. This entry specific addressing allows the direct functional relationship between individual data to be specified at the time of that data entry and to be retrieved with only a minimum of searching effort, again desirably employing a binary search to locate the desired entry without having to read all the entries in the linking list.

In addition to the usual field-defining concepts such as data format, maximum number of entries, and maximum size of each entry, two additional concepts are basic to the additional relationship defining fields, namely, "owned by" and "points to". It is important to realize that the additional relationship defining fields do not contain data but rather define relationships between data sets in entity fields. A field, whether an entity field or a relationship defining field, can have only one owner, but can own many other fields. The concept of ownership is best understood by reconsidering the example of the item field containing the list of model numbers referred to earlier. As indicated previously, item fields will usually contain entries which are duplicates of other entries in that same field, and thus retrieval access to the information in an item field must be through another field. That is, all item fields must have an owner field through which retrieval access is gained. In the entity-relational database of the preferred embodiment, not all fields can have an owner. For example, while all item fields have owners, no other entity field can have an owner.

Figure 3:
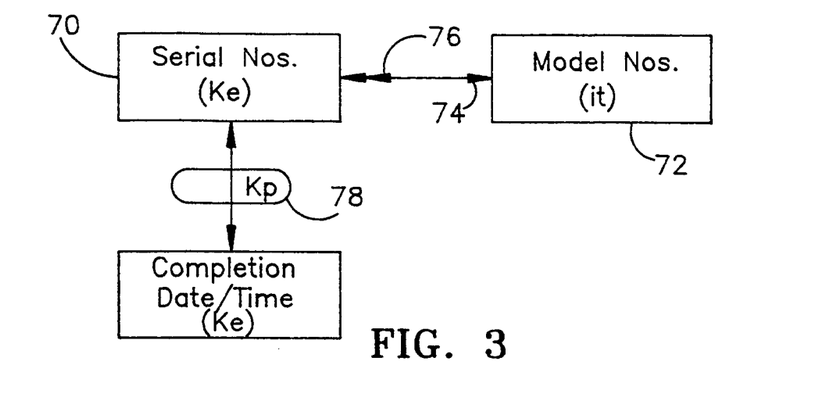
FIG. 3 is a diagram illustrating some of the basic relationships employed in an entity-relational database according to the present invention.

The somewhat related concept of "points to" is restricted solely to the additional relationship defining fields, and not used with any entity fields. The function of "points to" implies that a one-to-one or a one-to-many relationship exists between a first field and a second field. That is, the first field points to the second field when such a relationship exists. A given field can only point to a single field, not to two or more. On the other hand, a given field can be pointed to by many other fields. A simple example is in the relationship between a first key field containing parts serial numbers and a second key field containing the time/date of completion of the parts from a single line manufacturing process. Each entry in both sets of data is unique and externally defined, yet there is a relation between the two. In the entity-relational database of the preferred embodiment, one can construct one relationship defining field relating the parts serial numbers to the time/date of completion and, if desired, another relationship defining field relating the time/date of completion to the parts serial numbers. Each of the relationship defining fields 78 as shown in FIG. 3 are merely linking lists owned by one of the key fields and pointing to the other of the key fields. Since all linking lists are preferably internally organized as doubly-linked lists, the separate construction of two linking lists may not be necessary so long as the relationship between the key fields is one-to-one, but would be required if the relationship is one-to-many. Often the linking relationships are more complicated than one might first imagine. This requires one to carefully consider and plan the required inquiry paths, and preferably encourages one to continuously modify the inquiry paths based on an examination of the data reflecting the actual workings of the manufacturing process. It has also led to the symbolic adoption of several combined operations as a shorthand expression of a convenient commonly used package of a multitude of the basic entities and relationships previously described.

Figure 4:
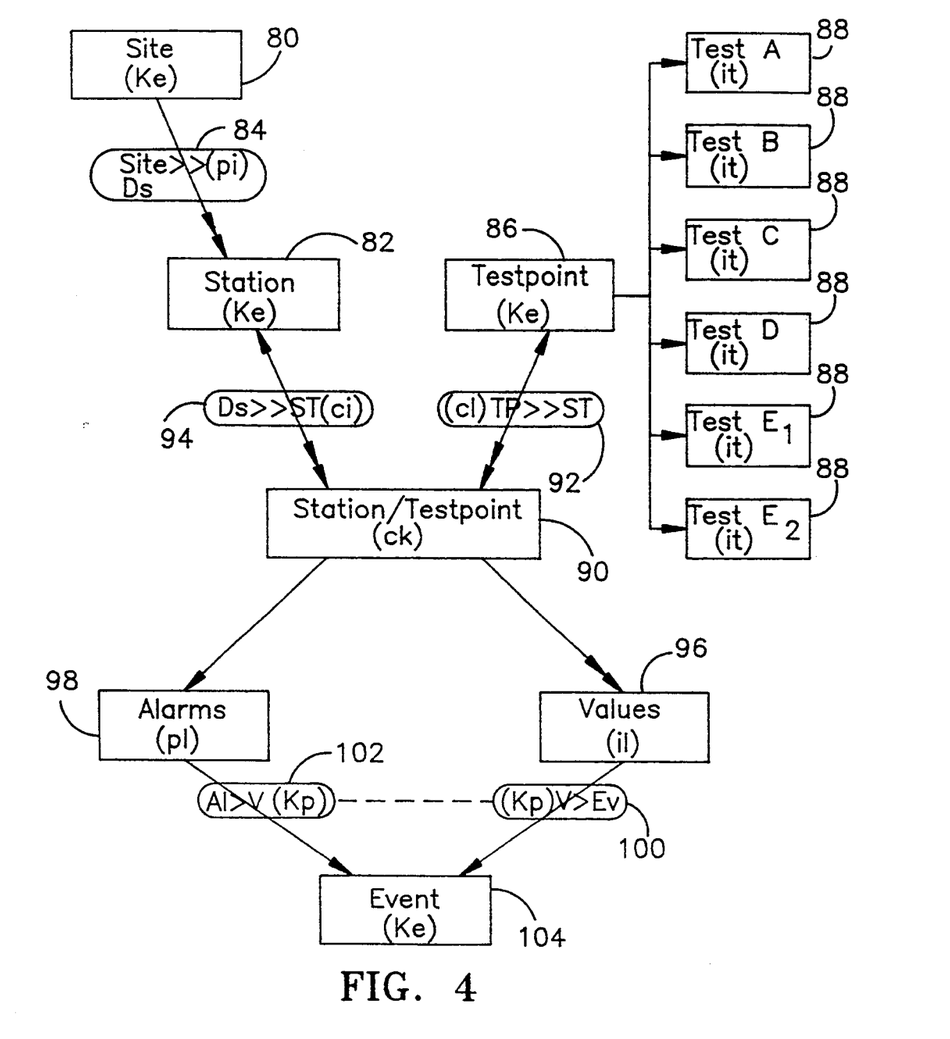
FIG. 4 is a simplified diagram of an operational entity-relational database for a monitoring system according to the present invention.

FIG. 4 shows an abbreviated diagram of the use of an entity-relational database of the preferred embodiment to carry out the manufacturing monitoring according to the present invention. The information concerning the various sites 14 is to be found in the key field 80 while information concerning the various data sources or stations 12 is found in key field 82. The relationship between the information in the two key fields 80 and 82 is specified by the non-exclusive linking list 84 which is a pointer linked list defining the one-to-many relationship existing between sites 14 and stations 12. The information being received from the various testpoints 16 is received in key field 86. This information is subjected to various selected statistical analyses based on the criteria and history specified in the item fields 88 each of which are owned by the testpoint key field 86. The relationship between the station key field 82 and the testpoint key field 86 is specified by a concatenated key field 90 which consists essentially of a plurality of ordered correlating lists of addresses which are searchable in however many ways are necessary to access the desired information. Each search access requires the construction of a related linking list and a minimum of two such linking lists 92 and 94 are required. The current history of the test values provided by the statistical analysis is available through linking list 96 while the alarm criteria values are available through linking list 98. The values in the linking lists are searched and the results directed by key pointer linking lists 100 and 102 to an event recording key list 104. It will be appreciated that appropriate outputs from the recording key list 104 can include the signal management previously discussed in connection with FIGS. 1 and 2.

Figure 5:
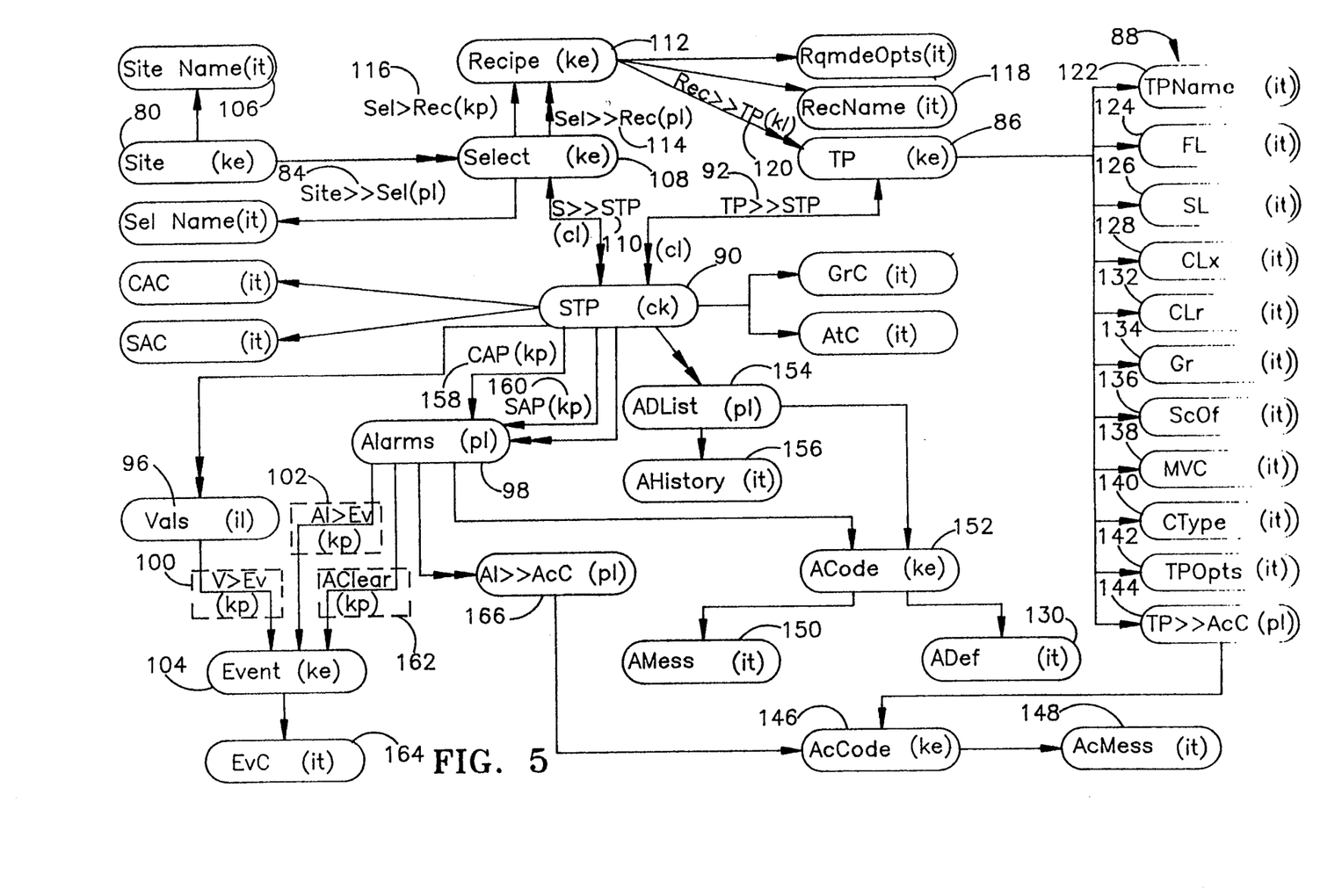
FIG. 5 is a detailed diagram of a preferred operational database for a monitoring system according to the present invention.

An example of a more complete entity-relational database to carry out the manufacturing monitoring according to the present invention is shown in FIG. 5. Despite its apparent complexity, the entity relations defined in the construction of such a database permit one to access any desired information in the database many times faster than would be possible using a comparable standard relational database. For simplicity, comparable portions of the databases shown in FIGS. 4 and 5 have been identified with the same reference numerals. The database shown in FIG. 5 contains some features not shown in FIG. 4. For example, the data included in the site key field 80 is more clearly defined by the addition of the item field 106, owned by site field 80, containing the actual descriptive names of the sites. The site key field 80 is coupled to the concatenated site/testpoint field 90 by the select key field 108 which allows values and alarms for test points to be grouped together according to a specific selection criteria, such as operator, process, or station. The actual association occurs at the concatenated field 90 with the aid of the linking list field 110.

The recipe key field 112 contains a unique set of test points each of which is representative of a particular process identified for consideration and study by the system. The recipe key field 112 is linked to the select key field 108 by linking list 114 which defines the list of all available recipes for each owning select process. Any given recipe can be pointed to by one or more selects if so linked by the linking list 114. The key pointer field 116 defines the currently active recipe for the owning select. It will be apparent that the key pointer field 116 cannot point to a recipe which was not previously linked to the particular select in question by the linking list 114. The item field 118 is used to more clearly define the owning recipe field and gives the name of the actual descriptive name for each recipe in the key field 112. Each recipe in the key field 112 is made up of one or more testpoints identified in the testpoint key field 86, however, each testpoint is found in one and only one recipe. The relationship between each recipe and the related testpoints is defined by linking list 120.

The item fields 88 which are owned by the testpoint key field 86 specify certain criteria and information related to each testpoint. Item field 122 contains a descriptive name for each associated testpoint in the testpoint key field 86. Item field 124 contains so called flyer limits which are the outside plausible limits on the data which should be received from the associated testpoint. Data outside these flyer limits are generally discarded by the system, however such a discard can be used to send an appropriate alarm code or message to the output signal manager. Item field 126 contains the specification limits for each testpoint. Usually the specification limits are in the form of a centerline or desired value and an upper and lower limit. Data that fall outside the specification limits but within the flyer limits are retained by the system and again an appropriate alarm code or message is sent to the output signal manager. Item field 128 contains the limits on the central tendency calculations performed on the data received from each testpoint. The data are tested against the limits in the item field as well as other criteria specified in the item field 130 to generate control alarms which are into the alarms field 98 of the database, and again an appropriate alarm code or message is sent to the output signal manager. The item field 132 contains yet another set of limits generally inside the control limits specifying the desired permissible variation or range over which reasonable process variation can be expected to occur.

Item field 134 contains the group size for the statistical grouping of data from each datapoint. Item field 136 contains scale and offset values which are used in various arithmetic operations to normalize the incoming data from each datapoint so as to be easily compared to the applicable standards. Item field 138 contains the maximum number of values which are to be retained by the database for each associated test point. The values specified in this field have the function of limiting the amount of historic data immediately available for review at any given instant in time. Longer term storage is of course available in permanent storage such as a hard disk or the like. Item field 140 specifies the type of statistical analysis which is to be performed on the data from each testpoint so as to monitor the particular manufacturing process involved. Finally, item field 142 contains various testpoint configurational options which are available. This field can be viewed as an on-line programming aid to the operator of the system to permit changes to be easily made in the database.

The linking list field 144 links each testpoint in key field 86 to assignable causes or corrective action codes which are found in key field 146. Each code in the key field 146 is further described by a set of messages contained in item field 148. The messages can describe a problem, can suggest an operation change which is needed, or carry any other message which allows an operator at one of the terminals 30 to understand in human terms the nature of an observed problem or condition. Preferably the message includes indication of the significance or importance of the observed problem or condition and the manufacturing process parameter involved thereby permitting human evaluation of and, if necessary, intervention in the manufacturing process. In the preferred embodiment, the significance indication is one of color with the most significant conditions being displayed in red on the video display of the appropriate terminal 30. Other human readable descriptive messages are stored in item field 150 which are associated with each alarm code which is found in key field 152. The alarm codes are accessed through the linking list field 154 which contains pointers to all of the alarm codes in field 154 associated with each select/testpoint concatenation. The linking list field 154 is used by the system to determine which control alarm criteria are to be tested for each testpoint. The associated item field 156 is used to contain an encoded history of prior occurring statistically significant events. The system uses this history to avoid repetitious signals or alarms concerning continuing process conditions. The actual presentation of the alarms is through a separate commercial windows presentation by which a non-exclusive iconic representation form is employed which can quickly be interpreted by an appropriate operator in charge of the particular process involved. Preferably, the iconic representation form is hierarchical permitting a single icon of a selected shape and color to represent a selected condition at a selected number of testpoints, the selection of the particular icon being based on the significance of the events detected or the number of events detected. A commercial windows presentation system can be employed to minimize the intrusiveness and screen space occupied by the presentation, yet maximize the impact of the presentation to the operator.

The existence of a current alarm to which no response has been received is indicated by one of the two key pointer fields 158 and 160 which monitor the existence of control alarms and specification alarms, respectively. The clearing of an alarm is controlled by key pointer field 162 while a record of significant events including alarms is maintained in item field 164. Field 166 relates all of the possible alarms for each particular testpoint to the assigned causes for the deviant process behavior. Item fields 168 and 170 are merely counters reflecting the number of various types of alarms currently indicated by the system. It will be appreciated that other information fields can easily be added to the database if desired. It will also be appreciated that in some circumstances some of the fields included in the example shown in FIG. 5 will not be needed.

Although the invention has been described in detail with reference to certain preferred embodiments and specific examples, variations and modifications exist within the scope and spirit of the invention as described and as defined in the following claims.

What is claimed is:

1. A system for monitoring a multiparameter manufacturing process by examining on a real-time basis a stream of data units, each data unit including a numerical characteristic indicative of a current state of one of the parameters of that manufacturing process and a tag identifying the parameter, the system comprising:

grouping means, operating on each data unit as it is received by the monitoring system, for grouping all of the data units having identical tags together into groups of numerical characteristics, the size of each group being selectively variable for each tag, pattern recognition means, operating as each data unit is received on each group of numerical characteristics assembled by the grouping means, for recognizing statistical patterns in the numerical characteristics, each pattern recognition means recognizing a single selected statistical pattern and including an output for result values indicative of the such recognition, a plurality of registers, each register receiving the result values from a selected pattern recognition means, comparing means for comparing the content of each register with a chosen standard for that register as each result value is received in the register to provide a comparison result at an output thereof indicative of the significance of any recognized statistical pattern, and signal managing means for directing to at least one controller of the manufacturing process a signal of the comparison result of any register the output of which indicates that a statistically significant pattern of numerical characteristics has been identified, the signal including an indication of the significance of the pattern and the manufacturing process parameter involved to permit human evaluation of and, if necessary, intervention in the manufacturing process.

2. The system of claim 1 wherein the pattern recognition means comprises calculating means for calculating a central tendency value for each group of numerical characteristics as the size of each group reaches that previously selected, and a plurality of testing means, each testing means receiving either the numerical characteristics or the calculated central tendency values of a single specified tag, for testing against a stipulated test value, as each characteristic or value is received, to detect statistical patterns in the numerical characteristics, the testing means including an output for said result values.

3. The system of claim 1 further comprising ranking means for ranking all of the plurality of registers associated with each specified tag in a selected order.

4. The system of claim 3 further comprising selecting means coupled to the output of the comparing means and the signal managing means for selecting the highest ranking register having a comparison result indicative of the detection of a significant statistical pattern for signalling by the signalling means.

5. The system of claim 1 further comprising recording means for recording all comparison results at the outputs of comparing means indicative of the detection of a significant statistical pattern to develop a history of all such comparison results for possible later review and analysis.

6. A system for monitoring a multiparameter manufacturing process by examining on a real-time basis a stream of data units, each data unit including a numerical characteristic indicative of a current state of one of the parameters of that manufacturing process and a tag identifying the parameter, the system comprising:

grouping means, operating on all data units having certain previously specified tags, for grouping all of the data units having identical tags together into groups of numerical characteristics, the size of each group being selectively variable for each tag, pattern recognition means operating on each group of numerical characteristics assembled by the grouping means for recognizing statistical patterns in the numerical characteristics, each pattern recognition means recognizing a single selected statistical pattern and including an output for result values indicative of such recognition, a plurality of registers, each register receiving the result values from a selected pattern recognition means, comparing means for comparing the content of each register with a chosen standard for that register after each result value is achieved in the register to provide a comparison result at an output thereof indicative of the significance of any recognized statistical pattern, and signal managing means for directing to at least one controller of the manufacturing process a signal of the comparison result of any register the output of which indicates that a statistically significant pattern of numerical characteristics has been identified, the signal including an indication of the significance of the pattern and the manufacturing process parameter involved to permit human evaluation of and, if necessary, intervention in the manufacturing process, the signal managing means further comprising signal comparing means for comparing each sequential pair of signals developed by the signal managing means, the signal comparing means allowing only non-repeating signals to be emitted therefrom.

7. A system for monitoring a multiparameter manufacturing process by examining on a real-time basis a stream of data units, each data unit including a numerical characteristic indicative of a current state of one of the parameters of that manufacturing process and a tag identifying the parameter, the system comprising:

grouping means, operating on all data units having certain previously specified tags, for grouping all of the data units having identical tags together into groups of numerical characteristics, the sizes of each group being selectively variable for each tag, the grouping means comprising a summing register for summing each group of numerical characteristics of the data units having identical tags together, and calculating means for determining a means value for each sum of numerical characteristics as the size of each group reaches that previously selected, pattern recognition means operating on each group of numerical characteristics assembled by the grouping means for recognizing statistical patterns in the numerical characteristics, each pattern recognition means recognizing a single selected statistical pattern and including an output for result values indicative of such recognition, a plurality of registers, each register receiving the result values from a selected pattern recognition means, comparing means for comparing the content of each register with a chosen standard for that register after each result value is received in the register to provide a comparison result at an output thereof indicative of the significance of any recognized statistical pattern, and signal managing means for directing to at least one controller of the manufacturing process a signal of the comparison result of any register the output of which indicates that a statistically significant pattern of numerical characteristics has been identified, the signal including an indication of the significance of the pattern and the manufacturing process parameter involved to permit human evaluation of and, if necessary, intervention in the manufacturing process.

8. A system for monitoring a multiparameter manufacturing process by examining on a real-time basis a stream of data units, each data unit including a numerical characteristics indicative of a current state of one of the parameters of that manufacturing process and a tag identifying the parameter, the system comprising:

grouping means, operating on all data units having certain previously specified tags, for grouping all of the data units having identical tags together into groups of numerical characteristics, the size of each group being selectively variable for each tag, pattern recognition means operating on each group of numerical characteristics assembled by the grouping means for recognizing statistical patterns in the numerical characteristics, each pattern recognition means recognizing a single selected statistical pattern and including an output for result values indicative of such recognition, a plurality of registers, each register receiving the result values from a selected pattern recognition means, comparing means for comparing the content of each register with a chosen standard for that register after each result value is received in the register to provide a comparison result at an output thereof indicative of the significance of any recognized statistical pattern, and signal managing means comprising a plurality of terminals positioned for review by controllers of the manufacturing process for directing to at least one controller of the manufacturing process a signal of the comparison result of any register the output of which indicates that a statistically significant pattern of numerical characteristics has been identified, each terminal including a video screen for displaying information selected by the controller, and means for selecting which of the plurality of terminals to which to send any particular signal, the signal including an indication of the significance of the pattern and the manufacturing process parameter involved to permit human evaluation of and, if necessary, intervention in the manufacturing process.

9. The system of claim 8 wherein the signalling means further comprises means effecting a window on the video screen of each selected terminal to indicate the statistical significance of the detected pattern and the manufacturing process parameter involved so as to permit human evaluation of and, if necessary, intervention in the manufacturing process.

10. The system of claim 8 wherein the signal managing means comprises means for retaining any information selected by the controller for display during the consideration and possible intervention so as to allow proactive control of the manufacturing process at the time the process is occurring.

11. The system of claim 1 including an entity-relational database including a plurality of entity fields containing ordered arrays of criteria specifying statistical patterns and limits for use by said pattern recognition means, and a plurality of relationship defining fields for correlating the entries in any two other fields.

12. The system of claim 11 wherein the relationship defining fields comprise doubly-linked lists linking the entries in two other fields, the entries in each doubly-linked list being arranged in an ordered array.

13. The system of claim 11 further comprising binary searching means for searching ordered arrays in fields whereby access to any desired entry therein is achieved without reading the contents of the field.

14. The system of claim 1 wherein the signal managing means includes means for providing a non-exclusive iconic presentation of said signal of the comparison result so that said controller of the manufacturing process can quickly interpret the significance of the signal and the identity of the manufacturing process parameter involved.

15. The system of claim 14 wherein the iconic representation form is hierarchical permitting a single icon of a selected shape and color to represent a selected condition at a selected number of testpoints, the selection of the particular icon being based on the significance of the events detected or the number of events detected.

16. A method for monitoring a multiparameter manufacturing process by examining on a real-time basis a stream of data units, each data unit including a numerical characteristic indicative of a current state of one of the parameters of that manufacturing process and a tag identifying the parameter, the method comprising the steps of:

grouping, for all data units having certain previously specified tags, all of the data units having identical tags together into groups of numerical characteristics, the size of each group being selectively variable for each tag, calculating a central tendency value for each group of numerical characteristics as the size of each group reaches that previously selected, and, as each subsequent data unit is received, recalculating the central tendency value for each group to which the numerical characteristic of the subsequent data unit is added, testing either the numerical characteristics or the calculated central tendency values of a single specified tag against a stipulated test value, as each characteristic or value is received, to detect statistical patterns in the numerical characteristics, the testing including an output of test result values indicative of the result of each test, storing the test result values in a plurality of registers, each register receiving the test result values from a selected test, comparing the content of each register with a chosen standard for that register after each test result value is received in the register to provide a comparison result at an output thereof indicative of the significance of any detected statistical pattern, and signalling to at least one controller of the manufacturing process the comparison result of any register the output of which indicates that a statistically significant pattern of numerical characteristics has been identified, the signalling including indicating the significance of the pattern and the manufacturing process parameter involved to permit human evaluation of and, if necessary, intervention in the manufacturing process.

17. The method of claim 16 further comprising the step of modifying, at any point during the examination of a stream of data units, the stipulated test value employed in any testing step.

18. The system of claim 16 further comprising the step of modifying, at any point during the examination of a stream of data units, any of the chosen standards employed in any comparing step to determine the significance of any detected statistical pattern.

19. The system of claim 16 further comprising the steps of defining sets of similarly situated data elements, and analyzing coordinate sets of the similarly situated data elements to detect patterns suggestive of causal relationships.

20. The method of claim 16 further comprising the step of recording all comparison results indicative of the detection of a significant statistical pattern to develop a history of all such comparison results for later review and analysis.

21. A method for monitoring a multiparameter manufacturing process by examining on a real-time basis a stream of data units, each data unit including a numerical characteristics indicative of a current state of one of the parameters of that manufacturing process and a tag identifying the parameter, the method comprising the steps of:

grouping, for data units having certain previously specified tags, all of the data units having identical tags together into groups of numerical characteristics, the size of each group being selectively variable for each tag, calculating a central tendency value for each group of numerical characteristics as the size of each group reaches that previously selected, testing either the numerical characteristics or the calculated central tendency values of a single specified tag against a stipulated test value, as each characteristics of value is received, to detect statistical patterns in the numerical characteristics, the testing including an output of test result values indicative of the result of each test, constructing an entity-relational database including a plurality of entity fields containing ordered arrays of criteria specifying statistical patterns, and selecting from the entity fields the criteria related to each test to be conducted during said testing step, storing the test result values in a plurality of registers, each resister receiving the test result values from a selected test, comparing the content of each register with a chosen standard for that register after each test result value is received in the register to provide a comparison result at an output thereof indicative of the significance of any detected statistical pattern, and signalling to at least one controller of the manufacturing process the comparison result of any register the output of which indicates that a statistically significant pattern of numerical characteristics has been identified, the signal including indicating of the significance of the pattern and the manufacturing process parameter involved to permit human evaluation of and, if necessary, intervention in the manufacturing process.

22. The method of claim 21 wherein the selecting step comprises conducting a binary search of at least one ordered array in a selected field whereby access to any desired entry therein is achieved without reading the contents of the field.

23. The method of claim 21 wherein the constructing step includes forming relationship defining fields having doubly-linked lists linking the entries in two other fields, the entries in each doubly-linked list being arranged in an ordered array.

24. The method of claim 21 further comprising the step of specifying the ranking of certain of the statistical pattern specifying criteria and associating the significance indication of said indicating step with the ranking of the statistical pattern.

25. The method of claim 24 further comprising selecting the highest ranking statistical pattern specifying criteria currently indicating the detection of a significant statistical pattern for signalling according to the signalling step.

26. A system for monitoring a multiparameter manufacturing process by examining on a real-time basis a stream of data units, each data unit including a numerical characteristic indicative of a current state of one of the parameters of that manufacturing process and a tag identifying the parameter and testpoint, the system comprising:

an entity-relational database including a plurality of entity fields for containing ordered arrays of information of the type including said numerical characteristics, standards and criteria specifying statistical patterns and operational limits, and a plurality of relationship defining fields for correlating the entries in any two other fields, grouping means, operating on all data units having certain previously specified tags, for grouping all of the data units having identical tags together into groups of numerical characteristics located in at least one of the plurality of entity fields, the size of each group being selectively variable for each field, pattern recognition means operating on each field containing a group of numerical characteristics assembled by the grouping means for recognizing statistical patterns in the numerical characteristics, each pattern recognition means employing criteria taken from at least one of the fields specifying statistical patterns to recognize a single selected statistical pattern, and including an output for result values indicative of the such recognition, a plurality of output receiving fields, each output receiving field receiving the result values from a selected pattern recognition means, comparing means for comparing the content of each output receiving field with a chosen standard related to that output receiving field after each result value is received to provide a comparison result at an output of the comparing means indicative of the significance of any recognized statistical pattern, and signal managing means for directing to at least one controller of the manufacturing process a signal of said comparison result including means for providing a non-exclusive iconic presentation of said signal of the comparison result so that said controller of the manufacturing process can quickly interpret the significance of the signal and the identity of the manufacturing process parameter involved to permit human evaluation of and, if necessary, intervention in the manufacturing process.

27. The system of claim 26 wherein the signal managing means further comprises means effecting a window on a video screen, the iconic presentation form being hierarchical to permit a single icon of a selected shape and color to represent a selected condition at a selected number of testpoints.

28. The system of claim 27 wherein the window effecting means comprises means for retaining any information selected by the controller for display during the consideration and possible intervention so as to allow proactive control of the manufacturing process at the time the process is occuring.

29. The system of claim 27 wherein the relationship defining fields comprise doubly-linked lists linking the entries in two other fields, the entries in each doubly-linked list being arranged in an ordered array.

30. The system of claim 27 further comprising binary searching means for searching ordered arrays in fields whereby access to any desired entry therein is achieved without reading the contents of the field.

31. The system of claim 27 wherein the iconic representation form is hierarchical permitting a single icon of a selected shape and color to represent a selected condition at a selected number of testpoints, the selection of the particular icon being based on the significance of the events detected or the number of events detected.

32. A system for monitoring a multiparameter manufacturing process by examining on a real-time basis a stream of data units, each data unit including a numerical characteristic indicative of a current state of one of the parameters of that manufacturing process and a tag identifying the parameter and testpoint, the system comprising:

a plurality of first testing means, each first testing means receiving the numerical characteristics of a single specified tag for testing against a stipulated test value as each data unit is received, and including an output for result values indicative of the current state of one of the parameters of the manufacturing process being monitored, grouping means, operating on each data unit as it is received by the monitoring system, for grouping all of the data units having identical tags together into groups of numerical characteristics, the size of each group being selectively variable for each tag, calculating means for calculating a central tendency value for each group of numerical characteristics as the size of each group reaches that previously selected, a plurality of second testing means, each second testing means receiving the calculated central tendency values of a single specified tag as each numerical characteristic is received to detect statistical patterns in the numerical characteristics, the testing means including an output for result values indicative of a recognized statistical pattern, a plurality of registers, each register receiving the result values from either a first testing means or a second testing means, comparing means for comparing the content of each register with a chosen standard for that register as each result value is received in the register to provide a comparison result at an output thereof indicative of the significance of the result value, and signal managing means for directing to at least one controller of the manufacturing process a signal of the comparison result of any register the output of which indicates that a significant result value has been identified, the signal including an indication of the significance of the value and the manufacturing process parameter involved to permit human evaluation of and, if necessary, intervention in the manufacturing process.

33. The system of claim 32 further comprising means for modifying the stipulated test value employed by any of the first testing means at any point during the examination of a stream of data units.

34. The system of claim 32 further comprising means for modifying any of the second testing means at any point during the examination of a stream of data units to change the detection criterion indicative of a recognized statistical pattern.

35. The system of claim 32 further comprising means for modifying any of the chosen standards employed by any comparing means to determine the significance of result values received by the comparing means.

36. The system of claim 32 further comprising means for defining sets of similarly situated data elements, and means for analyzing coordinate sets of the similarly situated data elements to detect patterns suggestive of causal relationships.

* * * * *